May 8, 1945.   M. L. SHULER   2,375,389
CHILD'S VEHICLE
Filed April 14, 1943

INVENTOR.
MORRIS L. SHULER
BY *Fay, Golick,*
*Chilton and Isler.*
ATTORNEYS.

Patented May 8, 1945

2,375,389

UNITED STATES PATENT OFFICE 2,375,389

CHILD'S VEHICLE

Morris L. Shuler, Cleveland Heights, Ohio

Application April 14, 1943, Serial No. 482,997

7 Claims. (Cl. 155—22)

This invention relates, as indicated, to children's vehicles, but has reference more particularly to children's vehicles of the straddle board or baby-walker type, having foot-boards for supporting the feet of the occupant when the vehicle is being used as a push or pull cart for the child.

The primary object of the invention is the provision of a novel foot-rest structure for vehicles of the class described, which is permanently attached to the vehicle, at least during the period in which the vehicle is interchangeably used both as a baby-walker and as a push or pull cart, and which is capable of easy and quick adjustment to either operative or inoperative positions as desired, and which, when in use, provides a firm support or platform on which the child may support its feet or on which the child may stand.

Another object of the invention is the provision of a novel foot rest structure for vehicles of the class described, having novel means for attachment thereof to the vehicle as well as for supporting the same in operative position.

A still further object of the invention is the utilization in the construction of a vehicle of the type described of only such materials as are readily available in commercially desirable quantities and are of a non-strategic or non-essential nature with reference to the present war effort, the invention being developed essentially to supply a current presssing demand for vehicles of this type, without, in any way, meeting that demand at the expense of demands necessitated for the successful prosecution of the war.

Other objects and advantages of the invention will be apparent during the course of the following description.

In the accompanying drawing, forming a part of this specification, and in which like numerals are employed to designate like parts throughout the same.

Figure 2:
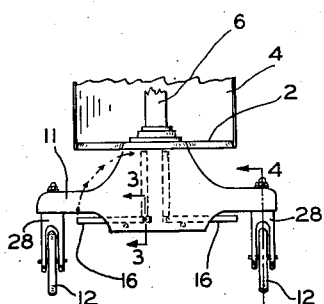
Fig. 2 is a fragmentary front elevational view of the vehicle.
Figure 1:
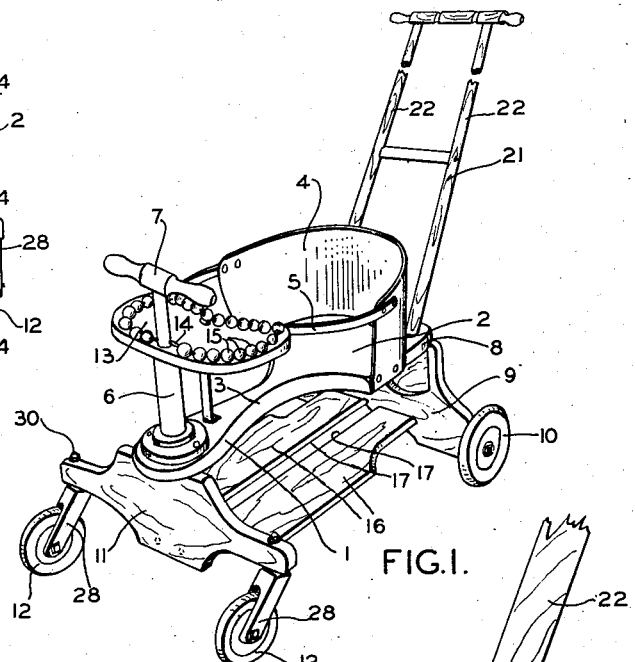
Fig. 1 is a perspective view of the vehicle.
Figures 4, 5:
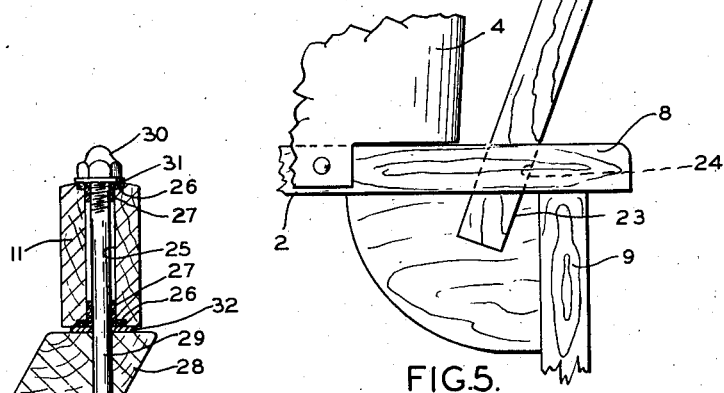
Fig. 4 is a cross-sectional view, taken on the line 4—4 of Fig. 2.
Fig. 5 is a fragmentary view showing the connection of the handle to the vehicle.
Figure 3:
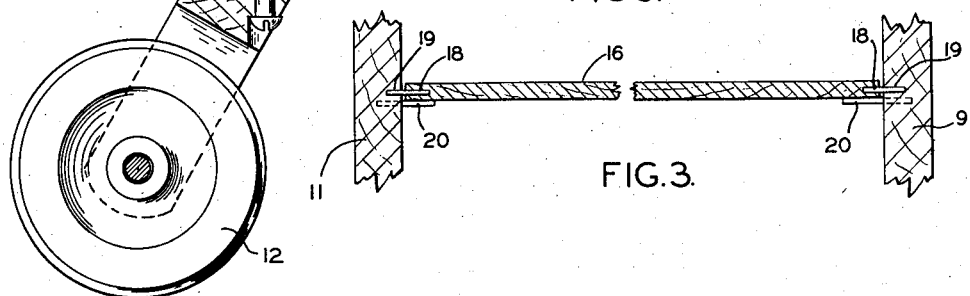
Fig. 3 is a cross-sectional view, taken on the line 3—3 of Fig. 2.

Referring more particularly to the drawing, the vehicle will be seen to comprise a saddle board 1, the rear portion of which provides a seat 2 from which projects a narrow or reduced portion 3 to provide a space on each side thereof to accommodate the legs of a child.

Secured to and partially encircling the seat 2 of the board 1 is a back rest 4, to which is secured a retaining ring or strip 5, which, together with the back rest serves to prevent the child from falling or moving from the seat.

Secured to and extending upwardly from the portion of the saddle immediately in front of the reduced portion 3 thereof is an upright or post 6, to the upper end of which a simulated steering handle 7 is secured.

The saddle board 1 has a portion 8 which extends rearwardly of the back rest 4 and is supported by a transversely extending supporting member or rear bolster 9, on the ends of which wheels 10 are revolubly mounted.

Supporting the saddle board 1 at a point directly below the post 6 is a transversely extending supporting member or front bolster 11 which carries at its ends casters or swivel wheels 12.

Mounted on the post 6 below the handle bar 7 is a tray 13, which is rounded at the front and curved at its rear to conform with the curvature of the retaining strip 5, being, in fact, secured to such strip, so as to rigidify the entire structure. The tray has secured thereto along its peripheral edge a wire 14 having strung thereon attractive multi-colored beads 15, as is customary in children's vehicles of this character.

The vehicle is also provided with foot-rest members or floor boards 16, which are permanently secured to the vehicle, and extend longitudinally of the vehicle below the straddle board 1 and between the bolsters 9 and 11. Each of such members is provided at its ends at points closely adjacent the inner edge 17 thereof with pins 18 which extend into recesses 19 in the bolsters 9 and 11, so as to permit pivotal movement of such members to either the operative position, as shown in solid lines in Fig. 2, or to an inoperative position, as shown in dotted lines in Fig. 2. When in operative position, the members 16 rest on pins 20 which project from the bolsters 9 and 11, but may be easily swung by hand about the pivots 18 to inoperative position, when so desired.

When the members 16 are in inoperative position, the child may place its feet on the ground or floor, and the vehicle, under such conditions, is used as a so-called baby walker, that is to say, the child, while seated in the vehicle, may propel it along the ground or floor by means of its feet, and may steer the vehicle to a certain extent, since the wheels 12 are swivelled.

The permanent character of the connection of the foot rest members to the vehicle is due to the fact that the pins 18 are entered in the recesses 19 at the time the foot rest members and bolsters are assembled, and cannot therefore be removed from the vehicle without disassembling the parts of the vehicle. If desired, the pins 18 may be permanently secured within the bolsters 9 and 11, and entered in recesses in the members 16 which correspond with the recesses 19, at the time of assembly.

This permanent connection of the members 16 to the vehicle is considered as particularly important in that there is no danger of the foot-board or foot rest becoming lost or disconnected from the vehicle, nor is there any danger of improperly installing the foot-boards, as has characterized all previous vehicles employing foot-boards or rests.

As previously stated, the members 16 may be tilted downwardly to their operative position, and when in such position, the child may rest its feet thereon, and the vehicle used as a stroller by attaching thereto a push or pull handle 21, comprising side bars 22, the terminals 23 of which may be removably inserted in inclined recesses 24 in the portion 8 of the saddle board 1. The handle is thus easy to insert in the recesses 24 and easy to remove therefrom.

Another feature of the invention is the manner in which the wheels 12 are mounted on the bolster 11. For this purpose, holes 25 are drilled vertically through the bolster at points adjacent the ends of the bolster, and these holes are countersunk at the top and bottom for the reception of bushings or bearings 26 which fit snugly in the countersunk portions of the holes and have reduced portions 27 which extend into the holes below said countersunk portions. The wheels 11 are mounted in forks 28, which are inclined at an angle to the axes of the holes 25, and are secured to the bolster 11 by means of screw bolts 29, which extend upwardly through the bearings 26 and holes 25, cap nuts 30 being secured to the upper ends of the bolts 29, these nuts being screwed down into engagement with washers 31, which are interposed between the upper bearings 26 and the nuts. Washers 32 are interposed between the forks 28 and the lower bearings 26. The bearings 26 are preferably made from vulcanized fiber or a similar material, which insures a noiseless action of the swivel wheels. The spaces between the bolts 29 and the holes 25 may be filled with a heavy grease or similar lubricant, so that the bearings for the bolts are in effect, self-lubricating, insuring, at all times, easy swivelling of the wheels 12.

It may be further noted that with the exception of the wire 14, bolts 29, nuts 30 and the necessary securing screws and rivets, that all of the parts of the vehicle are made of wood and fiber board, that is, materials which are readily available in commercially desirable quantities and are of a non-strategic or non-essential nature with reference to the war effort.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a child's vehicle of the type described, spaced bolsters, and foot-boards pivotally secured to said bolsters, said foot-boards being movable from a substantially horizontal position to a substantially vertical position, and means on the bolsters for supporting said foot-boards when in horizontal position.

2. In a child's vehicle of the type described, spaced bolsters, a pair of foot-boards extending between said bolsters, and pins extending from said boards to said bolsters and serving as pivots about which said foot-boards may be rotated from a substantially horizontal position to a substantially vertical position, and means on the bolsters for supporting said foot-boards when in horizontal position.

3. In a child's vehicle of the character described, spaced bolsters, a pair of foot-boards extending between said bolsters and spaced from each other along their inner longitudinal edges, pins adjacent said inner edges and extending from said boards to said bolsters, said pins serving as pivots about which said boards may be rotated from a substantially horizontal position to a substantially vertical position, and means on the bolsters for supporting said foot-boards when in horizontal position.

4. In a child's vehicle of the character described, spaced bolsters, a pair of foot-boards extending between said bolsters, pins extending from said boards to said bolsters and serving as pivots about which said foot-boards may be rotated from a substantially horizontal to a substantially vertical position, and other pins extending from said bolster and serving as supports for said boards when in horizontal position.

5. In a child's vehicle of the character described, spaced bolsters, a pair of foot-boards extending between said bolsters and spaced from each other along their inner longitudinal edges, pins adjacent said inner edges and extending from said boards to said bolsters and serving as pivots about which said foot-boards may be rotated from a substantially horizontal position to a substantially vertical position, and other pins extending from said bolster and serving to engage said boards at points adjacent their outer longitudinal edges to support the same when in their horizontal position.

6. In a child's vehicle of the character described, spaced bolsters having recesses therein, a pair of foot-boards extending longitudinally between said bolsters, pins permanently secured to said boards and extending from the ends of said boards at points adjacent their inner longitudinal edges and into said recesses, said pins serving as pivots about which said boards may be rotated, and means on the bolsters for stopping the rotation of the foot-boards about said pins.

7. In a child's vehicle of the character described, spaced bolsters having pins permanently secured thereto and extending into the space between said bolsters, a pair of footboards extending longitudinally between said bolsters and having recesses in the ends thereof at points adjacent the inner longitudinal edges thereof into which said pins extend, said pins serving as pivots about which said boards may be swung to operative position, and means on the bolsters for supporting said foot-boards when in operative position.

MORRIS L. SHULER.